(12) United States Patent
Skagerlund

(10) Patent No.: US 6,490,800 B1
(45) Date of Patent: Dec. 10, 2002

(54) PROCEDURE FOR MEASURING THE WHEEL ANGLE ON STEERABLE VEHICLES

(75) Inventor: Lars-Erik Skagerlund, Karlskoga (SE)

(73) Assignees: Optab Optronikinnovation AB, Karlskoga (SE); Josam Lastbilsteknik AB, Orebro (SE)

(*) Notice: Subject to any disclaimer, the term of this patent is extended or adjusted under 35 U.S.C. 154(b) by 0 days.

(21) Appl. No.: 09/673,240

(22) PCT Filed: Apr. 30, 1998

(86) PCT No.: PCT/SE98/00809

§ 371 (c)(1),
(2), (4) Date: Oct. 23, 2000

(87) PCT Pub. No.: WO99/57510

PCT Pub. Date: Nov. 11, 1999

(51) Int. Cl.⁷ ............................. G01B 5/20; G01B 11/26
(52) U.S. Cl. .................. 33/203; 33/203.12; 33/203.15; 33/203.18; 33/600
(58) Field of Search ............................... 33/203, 203.15, 33/203.18, 600, 203.12, 203.13, 203.14

(56) References Cited

U.S. PATENT DOCUMENTS

| | | | | |
|---|---|---|---|---|
| 3,234,656 A | * | 2/1966 | MacMillan | 33/203 |
| 3,680,369 A | * | 8/1972 | Merrill | 33/203.12 |
| 3,793,734 A | * | 2/1974 | Merrill | 33/203.12 |
| 4,953,296 A | * | 9/1990 | Spainhour | 33/203.18 |
| 5,014,227 A | | 5/1991 | M. J. Kling et al. | |
| 5,168,632 A | * | 12/1992 | Rimlinger, Jr. | 33/203.18 |
| 6,018,878 A | * | 2/2000 | Fukuda et al. | 33/203.12 |
| 6,154,970 A | * | 12/2000 | Reichelt et al. | 33/203 |
| 6,181,993 B1 | * | 1/2001 | Dale et al. | 33/203.18 |
| 6,219,134 B1 | * | 4/2001 | Voeller et al. | 33/203.12 |
| 6,374,159 B1 | * | 4/2002 | Naruse et al. | 33/203.15 |

FOREIGN PATENT DOCUMENTS

SE    96040589-9    5/1998

* cited by examiner

Primary Examiner—Christopher W. Fulton
Assistant Examiner—Yaritza Guadalupe
(74) Attorney, Agent, or Firm—Dennison, Schultz & Dougherty

(57) ABSTRACT

The present invention relates to a procedure for measuring the wheel angle on steerable vehicles. When determining large course angles, such as maximum wheel deflection, the course angle itself, which is difficult to measure, is not measured directly. Instead, the wheel camber (or turning) is measured and this angle is then utilized to calculate the course angle sought, with the aid of known values of straight course angles of the wheel and gradient of the kingpin.

1 Claim, No Drawings

PROCEDURE FOR MEASURING THE WHEEL ANGLE ON STEERABLE VEHICLES

BACKGROUND OF THE INVENTION

The present invention relates to a procedure for measuring large wheel angles, preferably front wheels, on steerable vehicles. The main requirement for achieving good running characteristics and slight tyre wear is for the driving wheels of the vehicle to assume specific angle positions with narrow tolerances. On a straight course, therefore, a certain toe-in occurs, which means that both wheels are directed slightly inwards in relation to the direction of travel. The wheels shall also have a certain camber in relation to a level road surface. When cornering both wheel axles are turned about individual kingpins which shall have a certain gradient in relation to the normal direction of a level road surface, both in the caster and in the banking (KPI) direction of the vehicle. Demands are also placed on the curve angle difference, i.e. the relationship of the drive angles of the two wheels to each other when cornering.

A large number of different measuring systems for the wheel angle have been developed to measure these angles. In most of them measuring devices are applied with the aid of holders on the wheels whose angles are to be measured. The measuring devices include measuring transducers for camber, toe-in and direction. The camber is normally measured as deviation from the vertical line and upon measuring it is assumed that the vehicle is parked on a level, horizontal surface. The rear axle is used when measuring toe-in and direction in the case of smaller vehicles such as private cars, whereas a reference line perpendicular to the chassis of the vehicle is preferred in the case of large vehicles. The measuring methods used are generally based on lines stretched between the wheels or on optical principles in which mirrors are applied on the rear wheels, or plates with markings are suspended at the front and rear ends of the vehicle chassis.

DETAILED DESCRIPTION OF THE INVENTION

These devices are used to directly measure toe-in and camber. The kingpin banking is determined indirectly by measuring the influence of the kingpin gradients on camber at a few different course angles, preferably straight course, 20 degrees left-turning course and 20 degrees right-turning course. The banking of the kingpins is determined in the same way or by measuring how much a locked wheel is turned in direction of rotation when a left-turning or right-turning course is steered. The kingpin gradients are calculated from the camber or wheel turning values obtained, using known trigonometric formulae, either with the aid of ready reckoners or nowadays computer programs.

A limitation in most existing wheel measuring systems is the difficulty of measuring large course angles. This is of interest when measuring the curve angle difference and the maximum wheel deflection possible for a vehicle. The main problem is that the maximum wheel deflection in many vehicles is so large that the wheel hub with the measuring device applied disappears into the wheel housing, which makes both optical measurement and stretching a straight measuring string impossible. Furthermore, if the rear axle is used as a reference during measurement, the wheel blocks the view of the wheel forming the outer curve. One way of overcoming this problem is to place the ordinary measuring device on an extension shaft so that it outside the wheel housing. However, this entails a number of extra manipulations and also assumes that the design of the wheel housing allows sufficient space for such an extension. The method otherwise most often used hitherto to avoid this problem has been to use special, separate measuring devices for these large angles. Such a measuring device may consist of swivelling, graduated measuring plates placed under the wheels, or of a scale placed on the ground close to the wheel, a measuring beam from the measuring device on the wheel being directed obliquely down towards this scale. Characteristic of the measuring devices are that they require irritatingly many manipulations to be applied and calibrated on site or that, due to their complexity, they entail unreasonable extra expense. Consequently measuring large course angles is in practice often omitted—even in cases when it is called for.

The object of the present invention is to provide an easily manageable method, suitable for automation, of determining the maximum wheel deflection and other large course angles ($\alpha_{horX}$) of vehicles. The procedure according to the invention involves measuring the toe-in ($\alpha_{toe}$) and camber ($\alpha_{camber}$) on a straight course in the conventional manner, and also measuring the usual angles when the wheels are driven and from this calculating the gradient of the kingpin in longitudinal direction (caster, $\alpha_{caster}$) and in transverse direction (banking, KPI, $\alpha_{kpi}$). Thereafter the course angle to be measured is set, e.g. maximum wheel deflection. Characteristic of the procedure according to the invention is that, instead of attempting to measure the course angle directly, the wheel camber ($\alpha_{camber}$), or alternatively the turning of the wheel upon locking of the brakes, is measured. The course angle sought is then calculated with the help of the angle thus measured as well as the other wheel and kingpin angles measured and calculated. This is possible since, just as the kingpin angles can be calculated on the basis of a few combinations of course and wheel camber angles, so also can an individual unknown course angle be measured on the basis of its equivalent angle of camber or turning and the kingpin angles. In practice this can easily be done using a ready reckoner or with the aid of a computer program. Since the straight course and kingpin angles are routinely determined when measuring a vehicle, the procedure in practice means that only one camber or turning measurement need be performed, and this can generally be performed using existing measuring equipment.

As regards calculation of the course angle, the variant of starting directly from the measured values from which the kingpin angles are calculated instead of utilizing the kingpin angles, falls within the scope of the invention.

What is claimed is:

1. A method of measuring a large course angle ($\alpha_{horX}$) for a wheel on a vehicle, comprising the steps of:

measuring a toe-in ($\alpha_{toe}$) on a straight course;

measuring a camber ($\alpha_{camber}$) on a straight course;

determining a caster ($\alpha_{caster}$) and a king pin inclination ($\alpha_{kpi}$) of the wheel from said camber ($\alpha_{camber}$) and said toe-in ($\alpha_{toe}$);

measuring turning of the wheel when the wheel is locked; and calculating large course angle ($\alpha_{horX}$) from the king pin inclination ($\alpha_{kpi}$).

* * * * *